(12) United States Patent
Mayer et al.

(10) Patent No.: US 9,751,682 B2
(45) Date of Patent: Sep. 5, 2017

(54) MODULAR CUBOIDAL PASSIVE TEMPERATURE CONTROLLED SHIPPING CONTAINER

(75) Inventors: William T. Mayer, Stacy, MN (US); Jacob Corder, Mound, MN (US)

(73) Assignee: Pelican Biothermal LLC, Plymouth, MN (US)

( * ) Notice: Subject to any disclaimer, the term of this patent is extended or adjusted under 35 U.S.C. 154(b) by 788 days.

(21) Appl. No.: 12/389,438

(22) Filed: Feb. 20, 2009

(65) Prior Publication Data
US 2010/0326993 A1    Dec. 30, 2010

(51) Int. Cl.
| | |
|---|---|
| B65D 81/38 | (2006.01) |
| F25D 3/08 | (2006.01) |
| F28D 20/02 | (2006.01) |
| B31D 5/00 | (2017.01) |
| F25D 23/06 | (2006.01) |
| F28D 20/00 | (2006.01) |

(52) U.S. Cl.
CPC ....... B65D 81/3813 (2013.01); B31D 5/0086 (2013.01); B65D 81/3825 (2013.01); F25D 3/08 (2013.01); F28D 20/02 (2013.01); F25D 23/063 (2013.01); F25D 2201/14 (2013.01); F25D 2303/0831 (2013.01); F25D 2323/061 (2013.01); F25D 2331/804 (2013.01); F28D 2020/0065 (2013.01); F28F 2270/00 (2013.01); Y02E 60/145 (2013.01); Y10T 29/49826 (2015.01)

(58) Field of Classification Search
CPC . F25D 3/06; F25D 3/08; F25D 23/063; F25D 2303/083; F25D 2303/0831; B65D 81/18; B65D 81/38; B65D 81/3823; B65D 11/1873

USPC ..... 62/62, 371, 372, 457.1, 457.2, 529, 530; 220/592.01, 592.03, 592.09, 592.1, 220/592.15, 592.2, 592.23, 592.24, 220/592.25, 592.26, 592.272, 592.27; 229/103.11

See application file for complete search history.

(56) References Cited

U.S. PATENT DOCUMENTS

| | | | |
|---|---|---|---|
| 2,087,966 A | * | 7/1937 | Clark .......................... 62/457.1 |
| 2,496,296 A | | 2/1950 | Frederick |
| 3,077,426 A | | 2/1963 | Johnston |
| 3,093,259 A | * | 6/1963 | Morrison ................. 220/592.25 |

(Continued)

FOREIGN PATENT DOCUMENTS

| | | |
|---|---|---|
| DE | 19915311 A1 | 10/2000 |
| DE | 10305550 A1 | 8/2004 |

(Continued)

OTHER PUBLICATIONS

Verner, Carl. "Phase Change Thermal Energy Storage". Dissertation. May, 1997.

(Continued)

*Primary Examiner* — Jonathan Bradford
(74) *Attorney, Agent, or Firm* — Sherrill Law Offices, PLLC

(57) ABSTRACT

A kit including a plurality of separate and distinct identically sized phase change material-containing panels shaped as a frustum of a right pyramid, a method of assembling a thermal insulating enclosure from such panels and the resultant assembled thermal insulating enclosure.

15 Claims, 2 Drawing Sheets

(56) References Cited

U.S. PATENT DOCUMENTS

| | | | | |
|---|---|---|---|---|
| 3,160,307 A | * | 12/1964 | Morrison | B65D 11/1873 165/135 |
| 3,236,206 A | | 2/1966 | Willinger | |
| 3,262,283 A | | 7/1966 | Taylor | |
| 3,420,363 A | * | 1/1969 | Blickensderfer | 206/524 |
| 3,570,699 A | * | 3/1971 | Kobayashi | 220/4.28 |
| 3,786,613 A | | 1/1974 | Shepheard | |
| 3,890,762 A | * | 6/1975 | Ernst et al. | 53/440 |
| 3,974,658 A | | 8/1976 | Starrett | |
| 4,010,865 A | * | 3/1977 | Wilgus | 220/6 |
| 4,044,449 A | | 8/1977 | Phan | |
| 4,145,895 A | | 3/1979 | Hjertstrand et al. | |
| 4,147,004 A | | 4/1979 | Day et al. | |
| 4,319,629 A | | 3/1982 | Hotta | |
| 4,324,111 A | | 4/1982 | Edwards | |
| 4,527,370 A | | 7/1985 | Schuette | |
| 4,529,638 A | | 7/1985 | Yamamoto et al. | |
| 4,682,708 A | * | 7/1987 | Pool | 229/103.11 |
| 4,688,398 A | | 8/1987 | Baek | |
| 4,730,748 A | * | 3/1988 | Bane | 229/103.11 |
| 4,877,128 A | | 10/1989 | Strickland | |
| 4,892,226 A | | 1/1990 | Abtahi | |
| 4,896,790 A | * | 1/1990 | Gronnevik | 220/592.01 |
| 4,923,077 A | | 5/1990 | Van Iperen | |
| 4,931,333 A | | 6/1990 | Henry | |
| 4,953,705 A | * | 9/1990 | Evamy | B65D 5/509 206/523 |
| 5,004,116 A | * | 4/1991 | Cattarozzi | 220/4.34 |
| 5,032,439 A | | 7/1991 | Glicksman et al. | |
| 5,050,387 A | | 9/1991 | Bruce | |
| 5,088,301 A | | 2/1992 | Piepenbrink | |
| 5,093,175 A | | 3/1992 | Goto et al. | |
| 5,419,152 A | * | 5/1995 | Silber | 62/372 |
| 5,435,142 A | * | 7/1995 | Silber | 62/60 |
| 5,441,170 A | | 8/1995 | Bane, III | |
| 5,562,228 A | | 10/1996 | Ericson | |
| 5,582,343 A | | 12/1996 | Dalvey | |
| 5,669,233 A | * | 9/1997 | Cook et al. | 62/371 |
| 5,756,179 A | | 5/1998 | Jutte | |
| 5,758,513 A | | 6/1998 | Smith | |
| 5,840,080 A | | 11/1998 | Der Ovanesian | |
| 5,848,508 A | | 12/1998 | Albrecht | |
| 5,875,599 A | | 3/1999 | McGrath et al. | |
| 5,897,932 A | | 4/1999 | McGarth et al. | |
| 5,899,088 A | | 5/1999 | Purdum | |
| 5,924,302 A | | 7/1999 | Derifield | |
| 5,979,693 A | * | 11/1999 | Bane, III | 220/592.2 |
| 6,164,030 A | | 12/2000 | Dietrich | |
| 6,168,040 B1 | | 1/2001 | Sautner et al. | |
| 6,209,343 B1 | | 4/2001 | Owen | |
| 6,220,473 B1 | * | 4/2001 | Lehman et al. | 220/592.27 |
| 6,223,551 B1 | | 5/2001 | Mitchell | |
| 6,233,965 B1 | | 5/2001 | Choy | |
| 6,250,104 B1 | | 6/2001 | Bostic | |
| 6,266,972 B1 | | 7/2001 | Bostic | |
| 6,325,281 B1 | * | 12/2001 | Grogan | 229/103.11 |
| 6,457,323 B1 | | 10/2002 | Marotta | |
| 6,467,323 B1 | | 10/2002 | Narushima et al. | |
| 6,474,095 B1 | | 11/2002 | Chan | |
| 6,502,417 B2 | | 1/2003 | Gano, III | |
| 6,718,776 B2 | | 4/2004 | Wessling | |
| 6,761,041 B2 | | 7/2004 | Roth et al. | |
| 6,765,031 B2 | | 7/2004 | Salyer et al. | |
| 7,257,963 B2 | * | 8/2007 | Mayer | 62/371 |
| 7,328,583 B2 | | 2/2008 | Hillman et al. | |
| 7,422,143 B2 | * | 9/2008 | Mayer | 229/103.11 |
| 7,500,593 B2 | * | 3/2009 | Mayer | 229/103.11 |
| 7,721,566 B1 | * | 5/2010 | Wilken | 62/371 |
| 7,908,870 B2 | * | 3/2011 | Williams et al. | 62/62 |
| 7,950,246 B1 | * | 5/2011 | Mayer et al. | 62/371 |
| 7,963,397 B2 | * | 6/2011 | Seagle et al. | 206/600 |
| 2002/0050147 A1 | | 5/2002 | Mai et al. | |
| 2002/0114937 A1 | | 8/2002 | Albert et al. | |
| 2002/0134962 A1 | | 9/2002 | Romero | |
| 2002/0144482 A1 | | 10/2002 | Henson et al. | |
| 2002/0147242 A1 | * | 10/2002 | Salyer et al. | 521/50 |
| 2004/0018335 A1 | | 1/2004 | Best | |
| 2004/0025528 A1 | | 2/2004 | Gano, III | |
| 2004/0074208 A1 | | 4/2004 | Olson et al. | |
| 2004/0079794 A1 | | 4/2004 | Mayer | |
| 2004/0180176 A1 | | 9/2004 | Rusek | |
| 2004/0231355 A1 | * | 11/2004 | Mayer | 62/371 |
| 2005/0188714 A1 | | 9/2005 | Wallace | |
| 2005/0189404 A1 | * | 9/2005 | Xiaohai et al. | 229/103.11 |
| 2007/0051782 A1 | * | 3/2007 | Lantz | 229/103.11 |
| 2008/0099492 A1 | * | 5/2008 | Mayer | 220/592.2 |
| 2009/0039088 A1 | * | 2/2009 | Williams | F25D 3/08 220/592.26 |
| 2009/0078708 A1 | * | 3/2009 | Williams | 220/592.2 |
| 2010/0326993 A1 | | 12/2010 | Mayer et al. | |
| 2011/0114513 A1 | | 5/2011 | Miller | |

FOREIGN PATENT DOCUMENTS

| | | | | |
|---|---|---|---|---|
| DE | 202007007394 | | 10/2007 | |
| EP | 0157751 A2 | | 10/1985 | |
| EP | 1099646 A1 | * | 5/2001 | B65D 81/38 |
| EP | 2022728 A1 | | 11/2009 | |
| WO | 99/32374 A1 | | 7/1999 | |
| WO | 2008137883 A1 | | 11/2008 | |
| WO | WO 2009019251 A1 | * | 2/2009 | B65D 81/3858 |
| WO | 2010055295 A1 | | 5/2010 | |

OTHER PUBLICATIONS

Third Party Observations Mailed Jun. 6, 2011 for EP 2221569 A1.
Office Action Mailed Jul. 25, 2012 for EP 2221569 A1.
Third Party Observations Mailed Nov. 25, 2015 for EP 2221569 A1.

* cited by examiner

MODULAR CUBOIDAL PASSIVE TEMPERATURE CONTROLLED SHIPPING CONTAINER

BACKGROUND

The shipment of temperature-sensitive goods is extremely difficult when the shipping container itself is not independently temperature-controlled; ie., does not have an independent power source for maintaining interior temperatures within close parameters. Of course, if it is merely desired to maintain an object to be shipped at a nominally cooled temperature—relative to the ambient exterior temperature—a common practice is to pack a shipping container with ice, and hope that the ice will remain in a frozen state during transit so that the object shipped will arrive at its destination still cooled below ambient temperature. This can be an adequate technique for shipping objects where temperature control is not critical. However, even in this case, the temperatures at different points inside the shipping container will vary widely, with parts of the interior of the container becoming quite cool, and other parts of the interior warming to various degrees, depending on time and the distance and spatial relationship of the shipped object to the cooling ice which remains in the container.

Goods such as medical supplies, blood, and vaccines are often extremely temperature sensitive and need to be maintained within a given temperature range. Transport is particularly challenging. Such temperature sensitive goods are shipped to a variety of destinations where the ambient outside temperature varies from extreme cold to extreme heat.

SUMMARY OF THE INVENTION

A first aspect of the present claimed invention is a thermal insulating kit. The kit includes an outer shell and at least four separate and distinct identically sized phase change material-containing panels wherein each panel is shaped as a frustum of a right pyramid.

A second aspect of the present claimed invention a method of assembling a thermal insulating enclosure. The method includes the steps of: (i) obtaining an outer shell defining a retention chamber having a top, bottom and at least four sides, (b) obtaining at least four separate and distinct identically sized thermally conditioned phase change material-containing panels wherein each panel is shaped as a frustum of a right pyramid; and (c) placing the thermally conditioned phase-change material-containing panels within the retention chamber of the outer shell with each panel abutting at least two other panels to define a thermal controlled interior volume defining a top, a bottom and at least four sides.

A third aspect of the present claimed invention is a thermal insulating enclosure. The enclosure is formed from and includes at least five separate and distinct identically sized thermally conditioned phase change material-containing panels each shaped as a frustum of a right pyramid wherein each panel abuts at least three other panels to define a thermal controlled interior volume.

DETAILED DESCRIPTION OF A PREFERRED EMBODIMENT

Figure 1:
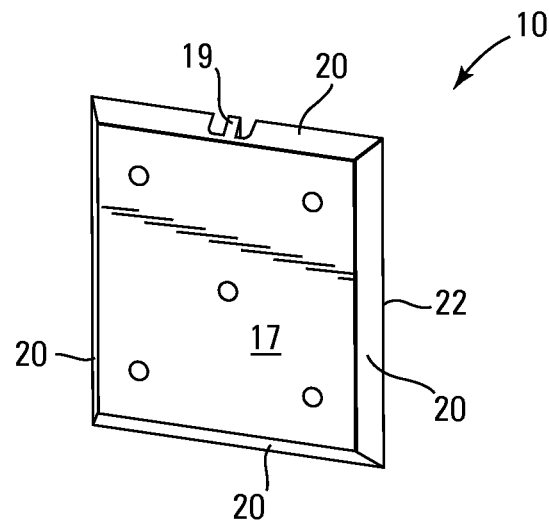
FIG. 1 is a perspective view of one embodiment of a single, phase change material-containing panel of the present claimed invention.
Figure 2:
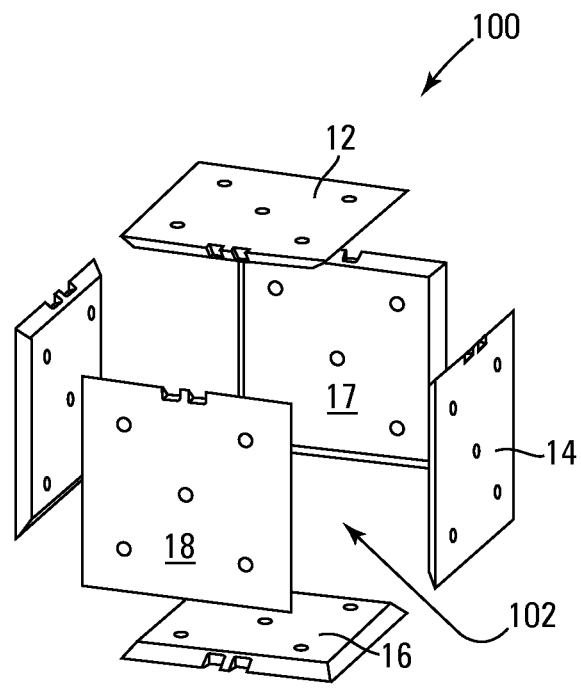
FIG. 2 is an exploded perspective view of a plurality of panels configured and arranged to form a thermal insulating enclosure.
Figure 3:
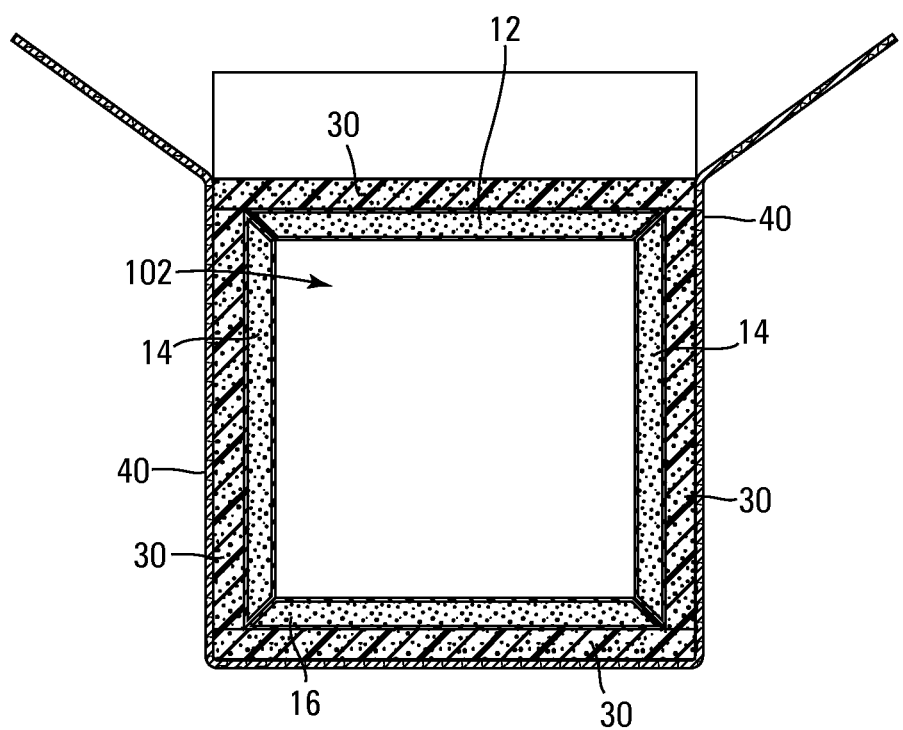
FIG. 3 depicts a plurality of panels of FIG. 1 interlocked to form a thermal retention chamber.

Nomenclature
10 Phase Change Material-Containing Panel
12 Top Phase Change Material-Containing Panel
14 Side Phase Change Material-Containing Panel
16 Bottom Phase Change Material-Containing Panel
17 Inner Surface of Phase Change Material-Containing Panel
18 Outer Surface of Phase Change Material-Containing Panel
19 Fill Port Collar (Pinched and Sealed)
20 Beveled Side
22 Panel Edge
30 Thermal Insulation Panels
40 Outer Shell
100 Thermal Insulating Enclosure
102 Thermal Controlled Interior Volume
Construction Referring to FIGS. 1-3 the invention is directed to a thermal insulating enclosure 100 comprising a plurality of separate and distinct phase change material-containing panels 10 (hereinafter "PCM panels") all configured and arranged to form a retention chamber 102. The PCM panel 10 is a frustum of a right pyramid and all four edges 22 of the top 12, bottom 16 and side panels 14 are 45° angles or bevels 20.

The present claimed invention depicts a thermal shipping container 100 comprising the PCM panels 10 defining an inner surface 17 and an outer surface 18. The PCM panels 10 are filled with a phase change material. The container 100 may have an outside shell 40 made from corrugated cardboard or the like holding the interconnected PCM panels 10 in a cube structure. Inserted snugly into the outer shell 40 is insulation 30 which at least partially covers the outer surface 18 of the PCM panels 10. The insulation may be a vacuum insulated panel 30, Styrofoam or the like, or any material having, good insulation qualities, ie., having a high thermal resistance "R". The article to be shipped is typically placed in the retention chamber 102, and then the thermal insulating enclosure 100 is sealed and shipped.

All of the abutting edges 22 of the PCM panels 10 are 45° bevels 20. Uniform side edges 22 at 45° bevels 20 may sealingly fit with any other 45° beveled edge 22 to form a retention chamber 102. This uniformity allows a user to easily construct a thermal insulating container 100 because all panels 10 are the same dimensions and are interchangeable. Replacement of damaged panels 10 is also simplified because all panels 10 are interchangeable due to the uniform abutting edges 22.

One embodiment of the thermal insulating enclosure 100 allows for six identical PCM panels 10 to interlock together inside an outer shell 40. Insulation 30 may be placed between the interlocking PCM panels 10 and the outer shell 40. Foam, thermal insulation panels 30 or other known insulation materials may be used. The PCM panels 10, filled with a temperature controlling phase change material, form a retention chamber 102 that completely and efficiently surrounds the article to be shipped. An efficient cube structure maximizes thermal performance of the thermal insulating enclosure 100 by minimizing thermal leakage from the corners and panel edges 22. The 45° bevels 20 seal the PCM panels 10 together so that there are no major areas that hot or cold air can bypass and affect the payload directly keeping the retention chamber 102 at a stable temperature. The 45° bevels 20 act as uniform mating surfaces for the interconnecting PCM panels 10 allowing for simple and easy replacement of damaged panels 10.

Further insulation may be provided by inserting thermal insulated panels 30 between the outer shell 40 and the outer surface 18 of the PCM panel 10. The vacuum or thermal insulated panels 30 may insulate all sides 14, top 12 and bottom 16 of the enclosure 100.

A second embodiment of the present invention comprises using only four interconnected PCM panels 10 as the side panels 14 of the retention chamber 102. Vacuum insulated panels 30, rather than PCM panels 10, can be used for the top 12 and bottom 16 of the thermal insulating enclosure 100. The enclosure 100 is sealed within an outer shell 40. The given embodiment does not provide optimal insulation because of the top 12 and bottom 16 of the enclosure 100 are insulted by only thermal insulated panels 30. However, because of the presence of PCM panels 10 insulating four sides of the enclosure 100, the overall insulation quality is increased when compared to alternative enclosures with only vacuum or thermal insulated panels 30.

The identical phase change material containing PCM panels 10 cut costs associated with tooling and manufacturing since only one PCM panel 10 size must be produced. Also, an end user need only store a single type of PCM panel 10 since any PCM panel 10 is interchangeable with another at any position on the retention chamber 102.

The PCM panels 10 may contain different phase change material. Ice can be referred to as a phase change material (hereafter "PCM"), which is characterized as a material which changes from a solid to a liquid at a "melting point" temperature, or from a liquid to a solid at the same "melting point" temperature, as thermal energy is either absorbed or released by the PCM, thus acting as a heat source or heat sink, depending on the circumstances.

Most solids are characterized by crystalline form, wherein the angles between adjoining faces are definite for a given type of crystal, and cleavage planes exist along which the crystal may be split. The structure is made up of units, (molecules, atoms or ions) arranged in a fixed, symmetrical lattice, the shape of which is dependent on the size and arrangement of the underlying units which are packed together. As a solid, the underlying molecules or other constituents are no longer able to move freely, as they are in the gaseous or liquid states.

When a crystalline solid is heated to a fixed temperature, it melts, or changes to a liquid. The "melting point" is a definite temperature for a given substance, and may be defined as the temperature when a solid and liquid are at equilibrium. For example, if the substance is a mixture of water and ice, at its melting point (0° C.), the ice and water remain in contact, with no tendency for one state to change to the other. This is the only temperature at which this condition exists; at temperatures above it the substance becomes liquid water, and at temperatures below it the substance becomes ice.

At the melting point temperature, the vapor pressures of the solid and liquid forms of a substance are the same; otherwise, one state would be converted into the other by passing through the gaseous condition. When liquids are cooled to the melting point and further quantities of heat are removed the liquid generally freezes with some liquid remaining. This solid and liquid mixture is at an equilibrium and at the same melting point temperature. However, if no solid crystals are present and if the liquid is not agitated, the temperature of liquids may be lowered below their normal freezing points without solidifying. These "supercooled" liquids have a higher vapor pressure than the solid form of the substance and hence a condition of equilibrium cannot exist.

Although molecules or other units of solids cannot move freely, nevertheless they possess thermal energy of motion in the form of vibration about fixed positions in the lattice structure. Heat must be supplied to a solid in order to raise its temperature to the melting point, where it transforms from a solid to a liquid, remaining at the melting point temperature until the transformation, is complete. If heat is removed from a liquid, its temperature drops until it reaches the melting point, and the liquid remains at the melting point temperature until it becomes transformed into a solid. Increase of temperature causes the molecules to vibrate more and more, until, at the melting point, this motion overcomes the binding forces in the crystal and the substance gradually passes into the liquid state. Therefore, a definite amount of heat, called the "heat of fusion", is required to separate particles from the crystal lattice. The "heat of fusion" is defined as the amount of heat (in calories) required to change one gram of the solid to a liquid, at the melting point. For ice, the heat of fusion is 79 calories (144 Btu/pound).

If it were desired to ship an article in an insulated package, and assuming it were necessary to maintain the article at a temperature below the expected ambient temperature to be encountered along the shipping route, it would be the normal practice to place the article and a packet of ice into the container and then ship it. The amount of ice required, and the size of the shipping container, would be estimated, depending upon the shipping time and the expected ambient temperature along the route, it being hoped that the article would arrive at its destination still cooled to a reasonable temperature below ambient.

The uncertainties of the foregoing example are evident, although the technique is commonly used when maintaining the temperature of the article is not critical, or when the article is sufficiently inexpensive to not require better handling. Other difficulties exist with the common technique; for example, the distribution of temperatures within the container is highly nonuniform. This is because the thermal flux entering the container flows from the outside ambient to the PCM over many different paths. After flowing through the outside, insulating panels, the heat flux flows along various paths through the air inside the container, each path having a different thermal resistance "R" depending upon path length, leading to a different thermal gradient from the insulating walls to the article inside the container. Therefore, some parts of the article shipped may be at one temperature and other parts may be at some other temperature. In particular, if the shipped article is placed atop a packet of ice, the underside of the article may be quite cool while the upper portions of the article may be excessively warm.

With the foregoing structure, thermal flux enters through the corrugated outside walls, and is attenuated through the thermal insulated panels 30. It is presumed that the PCM filling the PCM panels 10 is initially converted to a solid such as ice. The thermal flux engages the PCM and causes a gradual phase change of the solid into a liquid at the melting point of the solid. In the case of water/ice, the melting point is approximately 0° C., and therefore the interior temperature will remain at 0° C. for so long as it takes for all the ice to convert to water (144 Btu's per pound).

The thermal enclosure 100 is most efficient as a cube system, but is not limited to cubes. Side panels 14 can be different lengths to create rectangular shape thermal enclosure as well. Panels 10 that are the same size would be interchangeable still allowing the user to cut costs by storing a limited amount of interchangeable replacement panels 10.

The present invention may be embodied in other specific forms without departing from the spirit or essential attributes thereof; and it is, therefore; desired that the present embodiment be considered in all respects as illustrative and not restrictive, reference being made to the appended claims rather than to the foregoing description to indicate the scope of the invention.

We claim:

1. A thermal control kit comprising:
   (a) an outer shell;
   (b) a plurality of thermal insulating panels; and
   (c) a plurality of phase change material-containing panels;
   (d) wherein (i) the outer shell has a base and at least four sidewalls that define a volume, (ii) each and every thermal insulating panel is shaped as a rectangular cuboid, (iii) the plurality of thermal insulating panels are configured and arranged to form an insulated enclosure having a base and at least four sidewalls within the volume of the outer shell with each and every of the plurality of thermal insulating panels abutting more than two other of the plurality of thermal insulating panels at first interfaces, (iv) each and every phase change material-containing panel is shaped as a frustum of a right pyramid, (v) the plurality of phase change material-containing panels are configured and arranged to form an interior payload retention chamber having a base and at least four sidewalls meeting at corners within the insulated enclosure with each and every of the plurality of phase change material-containing panels physically interfacing with more than two other of the plurality of phase change material-containing panels at second interfaces; and (vi) the first and second interfaces forming a tortuous path for heat transfer between the outer shell and the interior payload retention chamber at each and every corner of the interior payload retention chamber.

2. The thermal control kit of claim 1 wherein the kit includes at least six separate and distinct identically sized phase change material-containing panels having a square base.

3. The thermal control kit of claim 1 wherein each phase change material-containing panel has a bottom surface, a top surface and side surfaces, and wherein the side surfaces join the bottom surface at a 45° angle.

4. A method of assembling a thermal control enclosure, comprising the steps of:
   (a) obtaining a thermal control kit in accordance with claim 1;
   (b) thermally conditioning the plurality of phase change material-containing panels;
   (c) placing the thermal insulating panels within the outer shell with each and every thermal insulating panel abutting at least two other thermal insulating panels at first interfaces to define a thermal controlled interior volume defining a top, a bottom and at least four sides; and
   (d) placing the thermally conditioned phase-change material-containing panels within the thermal controlled interior volume with each and every phase-change material containing panel abutting at least two other phase-change material containing panels at second interfaces to define a thermal controlled interior payload retention chamber defining a top, a bottom and at least four sides;
   (e) whereby the first and second interfaces form a tortuous path for heat transfer between the outer shell and the interior payload retention chamber at each and every corner of the interior payload retention chamber.

5. A thermal control shipping container, comprising:
   (a) an outer shell;
   (b) a plurality of phase change material-containing panels arranged within the outer shell; and
   (c) a plurality of thermal insulating panels arranged within the outer shell, between the outer shell and the plurality of phase change material-containing panels;
   (d) wherein (i) each and every thermal insulating panel is shaped as a rectangular cuboid, (ii) each and every of the plurality of thermal insulating panels abutting adjacent thermal insulating panels at first interfaces, (iii) each and every phase change material-containing panel is shaped as a frustum of a right pyramid, (iv) each and every of the plurality of phase change material-containing panels physically interfacing with adjacent phase change material-containing panels at second interfaces to form a thermal enclosure having an interior chamber for receiving an article to be shipped, and (v) the first and second interfaces forming a tortuous path for heat transfer between the outer shell and the interior chamber at each and every corner of the interior chamber.

6. The thermal control shipping container of claim 5, comprising at least four separate and distinct identically sized phase change material-containing panels.

7. The thermal control shipping container of claim 5 wherein the thermal insulation panels are at least four separately formed vacuum insulated panels.

8. The thermal control shipping container of claim 5 wherein each phase-change material-containing panel has a bottom surface, a top surface and side surfaces, and wherein the side surfaces join the bottom surface at a 45° angle.

9. The thermal control shipping container of claim 5 wherein the thermal insulation panels are vacuum insulated panels.

10. The thermal control shipping container of claim 5 wherein the plurality of phase change material-containing panels abut each other at the second interfaces, and paired first and second interfaces occur proximate and extend alongside each corner of the thermal enclosure with a plane defined by each first interface extending at an oblique angle relative to a plane defined by the paired second interface.

11. The thermal control shipping container of claim 5 wherein (i) the outer shell defines corners, (ii) the plurality of phase change material-containing panels abut each other at the second interfaces, (iii) a pair of first and second interfaces occurs proximate and extends alongside each corner of the outer shell, (iv) a plane defined by each first interface is offset from the associated corner, and (v) a plane defined by each second interface encompasses the associated corner.

12. The thermal control shipping container of claim 5 wherein each thermal insulating panel is a planar panel, and superimposed upon a phase change material-containing panel whereby an internal-facing major surface of each thermal insulating panel abuts an external-facing major surface of each phase change material-containing panel.

13. The thermal control shipping container of claim 5, wherein each and every of the plurality of phase change material-containing panels physically interfaces with more than two other of the plurality of phase change material-containing panels at the second interfaces to form the thermal enclosure.

14. The thermal control shipping container of claim 5, wherein each and every phase change material-containing panel is shaped as a four-sided frustum of a right pyramid having four side surfaces, with at least three of the four side surfaces of each and every phase change material-containing panel physically interfacing at the second interfaces with another of the phase change material-containing panels of the plurality of phase change material-containing panels.

15. A thermal control shipping container comprising:
 (a) an outer shell;
 (b) a plurality of phase change material-containing panels arranged within the outer shell; and
 (c) a plurality of thermal insulating panels arranged within the outer shell, between the outer shell and the plurality of phase change material-containing panels;
 (d) each phase change material-containing panel having a primary surface facing a respective one of the thermal insulating panels, each phase change material-containing panel having a plurality of beveled edge surfaces, the plurality of phase change material-containing panels being arranged with the beveled edge surfaces of each phase change material-containing panel engaging the beveled edge surfaces of at least three adjacent phase change material-containing panels at an interface, to form an enclosure having an interior chamber for receiving an article to be shipped, where each beveled edge surface interface extends along a plane that is at an oblique angled relative to the primary surfaces of the adjacent phase change material-containing panels that engage at the interface; and
 (e) each thermal insulating panel having a primary surface facing a respective one of the phase change material-containing panels, each thermal insulating panel having a plurality of engagement surfaces, the plurality of thermal insulating panels being arranged adjacent each other within the outer shell, with the engagement surfaces of each thermal insulating panel engaging at least three adjacent thermal insulating panels at an interface, the interface of engagement surfaces of the adjacent thermal insulating panels extending along a plane that is perpendicular to the primary surface of at least one of the adjacent thermal insulating panels that engage at the interface.

\* \* \* \* \*

(12) EX PARTE REEXAMINATION CERTIFICATE (11526th)
United States Patent
Mayer et al.

(10) Number: US 9,751,682 C1
(45) Certificate Issued: Jun. 7, 2019

(54) MODULAR CUBOIDAL PASSIVE TEMPERATURE CONTROLLED SHIPPING CONTAINER

(75) Inventors: William T. Mayer, Stacy, MN (US); Jacob Corder, Mound, MN (US)

(73) Assignee: PELICAN BIOTHERMAL LLC, Plymouth, MN (US)

Reexamination Request:
No. 90/020,120, Dec. 4, 2017

Reexamination Certificate for:
Patent No.: 9,751,682
Issued: Sep. 5, 2017
Appl. No.: 12/389,438
Filed: Feb. 20, 2009

(51) Int. Cl.
*B65D 81/38* (2006.01)
*F25D 3/08* (2006.01)
*F28D 20/02* (2006.01)
*B31D 5/00* (2017.01)
*F28D 20/00* (2006.01)
*F25D 23/06* (2006.01)

(52) U.S. Cl.
CPC ....... *B65D 81/3813* (2013.01); *B31D 5/0086* (2013.01); *B65D 81/3825* (2013.01); *F25D 3/08* (2013.01); *F28D 20/02* (2013.01); *F25D 23/063* (2013.01); *F25D 2201/14* (2013.01); *F25D 2303/0831* (2013.01); *F25D 2323/061* (2013.01); *F25D 2331/804* (2013.01); *F28D 2020/0065* (2013.01); *F28F 2270/00* (2013.01); *Y02E 60/145* (2013.01); *Y10T 29/49826* (2015.01)

(58) Field of Classification Search
None
See application file for complete search history.

(56) References Cited

To view the complete listing of prior art documents cited during the proceeding for Reexamination Control Number 90/020,120, please refer to the USPTO's public Patent Application Information Retrieval (PAIR) system under the Display References tab.

*Primary Examiner* — Patricia L Engle

(57) ABSTRACT

A kit including a plurality of separate and distinct identically sized phase change material-containing panels shaped as a frustum of a right pyramid, a method of assembling a thermal insulating enclosure from such panels and the resultant assembled thermal insulting enclosure.

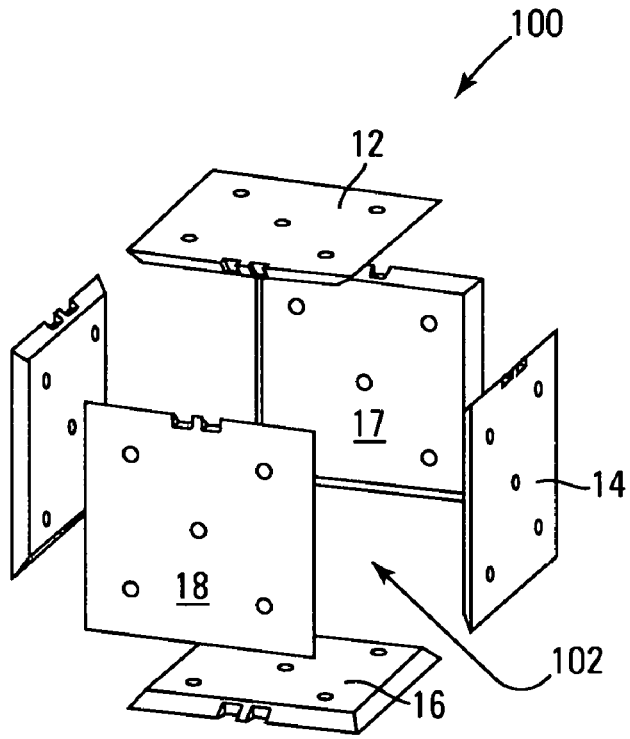

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-15 are cancelled.

\* \* \* \* \*